United States Patent [19]

Blake et al.

[11] 4,234,644
[45] Nov. 18, 1980

[54] COMPOSITE LAMINATION FILM FOR ELECTROPHORETICALLY TONED IMAGES

[75] Inventors: Stephen D. Blake; Katherine J. Lewis, both of Los Angeles, Calif.

[73] Assignee: Xonics, Inc., Van Nuys, Calif.

[21] Appl. No.: 4,366

[22] Filed: Jan. 18, 1979

Related U.S. Application Data

[63] Continuation of Ser. No. 889,647, Mar. 24, 1978, abandoned.

[51] Int. Cl.³ .................. B32B 7/14; B32B 9/04; C09J 5/00
[52] U.S. Cl. .................... 428/204; 428/215; 428/411; 428/412; 428/483; 428/508; 428/518; 428/476.9; 430/124; 156/309; 156/311; 156/324.4; 156/182
[58] Field of Search ............... 428/204, 411, 412, 508, 428/518, 483, 475.2, 476.1; 156/309, 311; 96/1.4; 430/124

[56] References Cited

U.S. PATENT DOCUMENTS

| 3,188,266 | 6/1965 | Charbonneau et al. | 428/483 |
| 3,535,112 | 10/1970 | Dolce et al. | 96/1.4 |
| 3,686,069 | 8/1972 | Winkler et al. | 156/309 |
| 3,949,148 | 4/1976 | Akman | 96/1.2 |
| 4,058,647 | 11/1977 | Inoue et al. | 156/309 |

Primary Examiner—William R. Dixon, Jr.
Attorney, Agent, or Firm—Harris, Kern, Wallen & Tinsley

[57] ABSTRACT

A composite lamination film for electrophoretically toned images deposited on a plastic receptor sheet, comprising, in combination, an optically transparent, flexible support layer, an optically transparent, flexible intermediate layer of a heat softenable film applied to one side of said support layer, and an optically transparent, flexible adhesive layer of a heat softenable film applied to the free side of said intermediate layer, said adhesive layer having good adhesion to said intermediate layer, said receptor sheet and said toned images deposited on said receptor sheet, the laminate thereof and the process for producing the laminate.

9 Claims, 2 Drawing Figures

COMPOSITE LAMINATION FILM FOR ELECTROPHORETICALLY TONED IMAGES

This is a continuation of application Ser. No. 889,647, filed Mar. 24, 1978, now abandoned.

BACKGROUND OF THE INVENTION

The present invention relates to laminating films, and more particularly to a heat softenable laminating overlayer to fix electrostatically toned images deposited on a plastic dielectric receptor, such as is produced in an electroradiographic process.

Heretofore, electrostatically toned images have been fixed by one of three methods. The first method consisted of overcoating the dry toner layer with a suitable plastic receptor adherent, scratch resistant resin, dissolved in a suitable non-flammable solvent or aqueous cosolvent. A second method involved depositing the toner on a suitable pre-coated substrate and subsequently softening the pre-coat with heat or vapor to cause it to encapsulate the non-melting toner particles. The third method was laminating the receptor with corona treated polyethylene on thin polyethylene terephthalate as the lamination film composite.

The first method had several problems. First, there was gumming up of various components in the apparatus occuring due to the evaporation of solvents. The solvents could not be totally contained in an intermittently opened system. Secondly, it was difficult to attain the scratch and flex resistance comparable to that of conventional silver-based film immediately after the removal of the bulk of the solvents, as traces of solvent residues were present leaving the apparently dry film vulnerable to scratching. Thirdly, drying the overcoat to a smooth film was often difficult. Fourthly, the solvent or cosolvent presented problems with being either too toxic, too flammable, too volatile or too slow drying. The aqueous cosolvent systems usually had borderline capability of being able to easily wet and penetrate the high density toner buildup in background areas due to non-compatibility problems between very non-polar toner resins and the aqueous cosolvent solutions.

The second method encountered difficulties with the softenable pre-coat on the receptor sheet. The heat softenable pre-coat lacked even moderate resistance to heat. Some pre-coats were humidity sensitive and had poor electrical characteristics compared to the substrate. It was difficult to achieve both toner compatibility or wettability but non-solubility and at the same time adhesion for the support film, especially with currently used toner formulations.

The third method employing a support layer with a corona treated polyethylene as the lamination film composite encountered two types of difficulties. The first difficulty was that the polyethylene layer blocked at about 60° C. The second problem was that at or below 120° C., the low density polyethylene employed neither reached a low enough melt viscosity nor exhibited enough toner wettability to give sufficient penetration of the high density toner deposits even when high pressure was used in the nip rollers. In addition, the high tension resulting from the high pressure at the nip roller gave too much curl when used on a single sided lamination. Double side lamination proved to be economically prohibitive.

Ohta et al, U.S. Pat. No. 4,060,441, discloses a transparent thermal bonding layer which may be used to provide a coating material. This transparent thermal bonding layer is made from either a polyvinyl chloride, polyvinyl acetate or polyamide resin. This single layer protective coating merely protects the object to be coated from mutilation and dirt.

This invention relates to a new and improved composite lamination film for use in protecting the improved dielectric receptor sheet of the type used in electron radiography systems. A typical system which provides for the creation of X-ray images is described in the Muntz et al U.S. Pat. No. 3,774,029, entitled Radiographic Systems with Xerographic Printing. In such a system, an X-ray opaque gas at high pressure is utilized between electrodes in an imaging chamber to produce a photoelectric current within that chamber as a function of X-rays entering the chamber. The current is collected on a receptor sheet placed on one of the electrodes, resulting in a latent electrostatic image on the sheet. This latent image is then made visible by developing following conventional xerographic techniques.

SUMMARY AND OBJECTS OF THE INVENTION

An object of the present invention is to provide a new and improved heat softenable laminating overlayer to fix electrophoretically toned images deposited on a plastic dielectric receptor sheet.

Another object of the present invention is to obtain improved scratch and flex resistance for the electrophoretically toned images deposited on the plastic dielectric receptor film.

Another object of the present invention is to eliminate the gumming up of various components in the apparatus for producing electrophoretically toned images due to the evaporation of solvent(s).

Another object of the present invention is to obtain a smooth film coat on the electrophoretically toned image deposited on the plastic dielectric receptor sheet.

Another object of the present invention is to eliminate the toxicity, flammability, volatility and slow drying problems associated with solvents or cosolvents.

Another object of the present invention is to improve the ability of the adhesive to easily wet and penetrate the high density toner buildup on the plastic dielectric receptor sheet.

Another object of the present invention is to improve the heat resistance of the plastic dielectric receptor sheet.

Another object of the present invention is to reduce the humidity sensitivity of the plastic dielectric receptor sheet.

Another object of the present invention is to achieve toner compatibility or wettability but non-solubility with the adhesive but maintain adhesion for the plastic dielectric receptor sheet.

Another object of the present invention is to improve the electrical characteristics of the plastic dielectric receptor sheet.

Another object of the present invention is to eliminate blocking problems with the lamination film.

Another object of the present invention is to obtain an adhesive with a low melt viscosity and good toner wettability to give good penetration of high density toner deposits on the plastic dielectric receptor sheet.

Another object of the present invention is to eliminate the need for high pressure at the nip rollers of the laminating apparatus.

Another object of the present invention is to reduce the amount of curl of the plastic dielectric receptor sheet after receipt of the protective overlay.

In accordance with this invention, these and various other related objectives of the present invention, as will be apparent from a detailed consideration of this entire specification, are achieved by a composite lamination film for electrophoretically toned images deposited on a plastic dielectric receptor sheet, comprising, in combination, an optically transparent, flexible support layer, an optically transparent, flexible intermediate layer of a heat softenable film applied to one side of said support layer, said intermediate layer having good adhesion to said support layer, said receptor sheet and an adhesive layer applied to its free side, and an optically transparent, flexible adhesive layer of a heat softenable film applied to the free side of said intermediate layer, said adhesive layer having good adhesion to said intermediate layer, said receptor sheet and said toned images deposited on said receptor sheet, said adhesive having a low melt viscosity below 120° C. to insure good penetration of said dried toner deposits.

BRIEF DESCRIPTION OF THE DRAWINGS

This composite lamination film for the plastic dielectric receptor sheet protects the electrophoretically toned images deposited thereon and is illustrated in the accompanying drawings.

From a consideration of the remainder of this specification and of the drawings it will be realized that the illustrated composite lamination film is not the present invention itself, but is a specific structure embodying the essential features or concepts of the present invention. Such features or concepts are defined or summarized in the appended claims. They may be utilized within a number of structures which may differ significantly in appearance from one another.

DESCRIPTION OF THE PREFERRED EMBODIMENT

Figure 1:
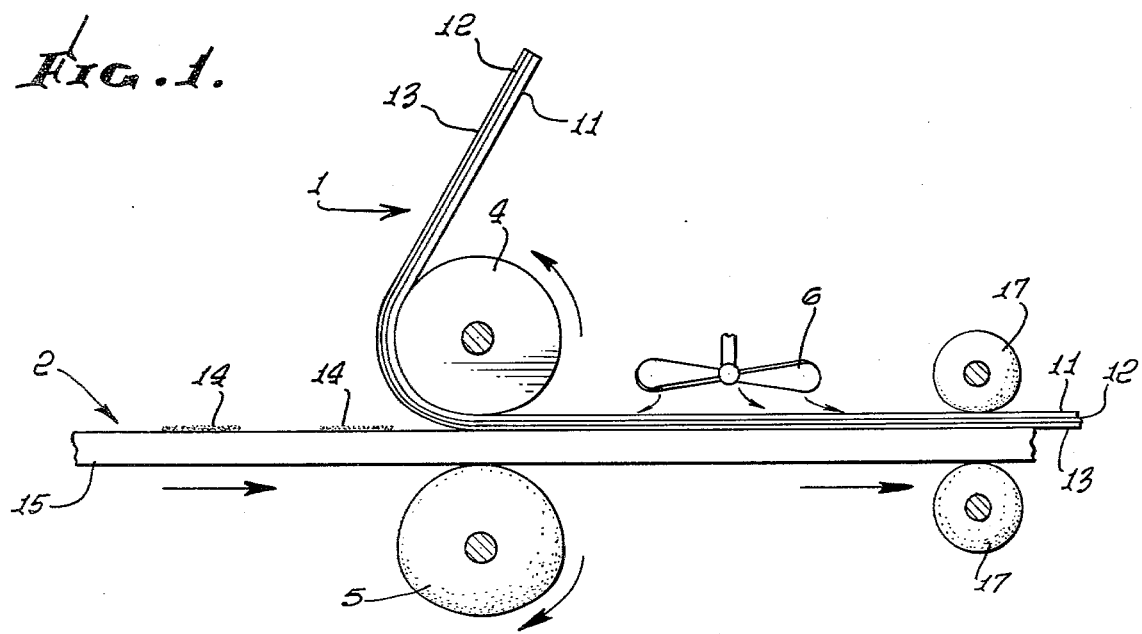
FIG. 1 is a cross-sectional schematic view showing the composite lamination film, the receptor sheet and the apparatus during the bonding process.

Illustrated in FIG. 1 is a composite laminate film 1 being applied to a plastic receptor sheet 2 having electrophoretically toned images 14 deposited thereon. The composite laminate film 1 has a support layer 11, an intermediate layer 12 and an adhesive layer 13. A heated back roller 4 softens the intermediate layer 12 and the adhesive layer 13 prior to bonding the composite laminate film 1 to the plastic receptor sheet 2. The heated back roller 4 is maintained at a temperature of from about 120° to 150° C. The amount of heat applied to the film 1 may be varied by varying the temperature of the heated roller. Alternatively, a stationary hot shoe may be used in place of the heated back roller 4. The film 1 and sheet 2 are forced together under pressure by the heated back roller 4 and a lower roller 5 to form a composite laminate. A fan 6 circulates ambient air around the composite laminate as it is transported away from the laminating area by one or more pairs of soft rubber rollers 17. The laminating speed is about one foot per minute (± one half foot per minute).

The support layer 11 is mechanically strong but flexible, optically clear and has a sufficiently high melting point to remain undistorted while the intermediate 12 and adhesive layers soften. Preferably, the support layer 11 has a tensile strength greater than 10,000 psi; an optical density less than 0.01 at 2 mil thickness as measured by a Macbeth Quanta Log Transmission Densitometer (Model TD-102); a thickness of from 0.1 to 7.0 mils with a preferred range of 0.5 to 3.0 mils; a resistance to melting and blocking at 125° C. at 0.5 to 10.0 psi contact pressure; and a residual shrinkage at 125° C. of less than 1.5%. Additionally, the support layer is preferably thermally stable (no decompositon, softening, yellowing or clouding) after exposure to 3 hours at 125° C.; non-brittle when stored and handled at temperatures as low as −29° C., 5 to 95% relative humidity; hard enough to give at least 50 g. scratch resistance by ASTM No. D-2197-68, Method I (modified by the use of the sapphire needle of Method II in place of the loop); slow burning; sufficiently flexible at ambient temperatures to wind around a ¼ inch mandrel without cracking or permanently distorting; and surface treated by conventional methods, such as corona discharge or polyamine primer, to improve the adhesion of succeeding layers.

The support layer 11 may be made from polyethylene terephthalate (PET), polycarbonate, polysulfone, cellulose triacetate or vinyl chloride/vinylidene chloride copolymers. The preferred material is polyethylene terephthalate. Generally, the support layer 11 is pretreated by a proprietary process for improving adhesion. These proprietary processes generally involve either a corona treatment or a primer. Primers which have been employed are aliphatic and aromatic polyamines such as those used to cure epoxy resins. Examples of commercially available polyethylene terephthalate film are:

Mylar ® supplied by duPont
Melinex ® 442 supplied by I.C.I.
Celanar ® supplied by Celanese Examples of alternatives to polyethylene terephthalate film are films made from:

polycarbonate—supplied by G.E. under Lexan ®, and Allied Chemical
polysulfone—supplied by Allied Chemical, Rowland, Cadillac
cellulose triacetate—supplied by Kodak, X-Cel, I.C.I.
vinyl chloride/vinylidene chloride—supplied by Borden, Dow, Ethyl The intermediate layer 12 is usually a thin layer of a low density polyethylene (PE) applied to the treated support layer by extrusion and subsequently corona treated. The intermediate layer can range in thickness from about 0.05 to 4.0 mils with the preferred range being about 0.25 to 0.75 mils. The intermediate layer is as optically clear as possible, relatively flexible or impact resistant and of moderately high molecular weight to give high tensile strength or toughness to the glue line. The intermediate layer is also adherent to the support layer, and proportionately high in aliphatic hydrocarbon content in order to be chemically compatible with the low melting adhesive layer 13. The proportionately high aliphatic hydrocarbon content will allow good mechanical mixing between the two adhesive layers to give a tough glue line.

The intermediate layer 12 may be made from olefin homo- or copolymers such as ethylene or propylene, copolymerized with small amounts of vinyl or acrylic monomers such as vinyl acetate, ethyl acrylate or methacrylic acid. Small amounts of copolymer will improve the optical clarity of the polyolefins but the maximum which can be used depends upon compatibility with the adhesive layer 13 and with the particular toners being used. Polyolefins and their copolymers are easily and economically extruded onto continuous webs. Other non-polar, but physically adherent materials may also work as substitutes for polyolefins such as lower moderate molecular weight hydrocarbon rubbers, etc. These other materials could probably also be extruded, but more likely would be coated on from a solvent which is somewhat more expensive. These alternative materials to the intermediate layer 12 are also not sufficient by themselves to penetrate the toner, since they, like the polyolefins, do not reach low melt viscosities at or below 120° C. and have the additional problem in that they usually soften over wide ranges leading to blocking problems. Preferably, the intermediate layer 12 promotes the adhesion of a toner compatible resin to the untoned support layer with an adhesive bond strength greater than 2 pounds/inch as measured by the Xonics or Guardian Lamination Peel Test; is optically clear in the laminated condition having an optical density less than 0.005 at 0.5 mil thickness; has a minimum light scattering "fog" visible to the naked eye in comparing an untoned, unlaminated 5 mil PET film with an untoned but laminated one; is 0.25 to 0.75 mil in thickness; has a residual shrinkage at 125° C. of less than 1.5% to avoid curl of the single sided lamination; is thermally stable after exposure for 3 hours at 125° C.; is non-brittle when stored and handled at temperatures as low as −29° C., 5 to 95% relative humidity; is slow burning; is surface treated, generally by corona discharge, to a surface tension level of 40 dynes/cm for improved adhesion to the adhesive layer 13; softens between 60° C. and 125° C.; is sufficiently flexible at room temperature when coated on PET to bend around a ¼ inch mandrel without permanently distorting; and is chemically compatible with the adhesive layer 13, such that it mixes with the adhesive layer in the boundary area and forms a single, relatively clear homogeneous phase. Examples of low density polyethylene resins (of M.I.* = 3 to 5) are the following:

Dow PE Resin 5004, M.I. = 4.5,
Gulf PE 4516, M.I. = 4.5, and
U.S.I. NA 205, M.I. = 3.0.

In addition, Tenite resins from Eastman Kodak and LD resins from Exxon may be used.

*NOTE: M.I. = melt index

The adhesive layer 13 softens at a temperature below the distortion point of the support layer (usually PET and therefore below about 120° C.). At the same time, the adhesive layer shows no blocking or distortion up to the highest temperature a roll of film will be expected to be exposed to in storage, transport, etc. With some margin of error, this latter temperature is about 60° C. to 70° C. The adhesive layer reaches a relatively low melt viscosity (less than 250 P) at or below 120° C. to insure good, low shear fluid penetration of the dried toner deposits. Thus, something with a sharp crystalline-like melting range (within 10° C.) is desirable for the adhesive layer resin. In addition, the adhesive layer resin is of a relatively low molecular weight and non-polar in character (proportionately high in aliphatic hydrocarbon content) in order to be compatible with the toner and the intermediate, higher tensile strength polyolefin layer. The adhesive layer resin wets well both the dried toner deposit and the toned polyester surface in order to give a highly peel resistant bond in the final laminate. The adhesive layer ranges in thickness from about 0.05 to 2.5 mils depending on the toner density, with the preferred range being about 0.2 to 0.5 mils for optical densities up to 4 or 5. Preferably, the adhesive layer is compatible with the radiographic imaging toner, wetting it well up to optical densities of about 5 and adhering to the treated support layer 11 such that the peel strength as measured above is greater than 2 pounds/inch; is tack free and does not block or transfer when stored against the support layer 11 at humidity levels from 5 to 95% relative humidity and at temperatures from about −29° C. to 60° C. with contact pressures of about 0.5 to 10.0 psi; has an optical density less than 0.005 at 0.3 mil when part of a laminate between two support films 11; shows minimum shrinkage as it cools to avoid curling of the single sided laminations; is thermally stable after exposure for 3 hours at 125° C.; is slow burning; and is sufficiently flexible at ambient temperatures that when coated on the combined intermediate/support layers at about 0.3 mil thickness that it may be wound around a ¼ inch mandrel without permanently distorting.

The radiographic imaging toner is dispersed in a non-polar, aliphatic hydrocarbon media and is coated with a non-polar, aliphatic hydrocarbon character resin.

Optical density is the log of the absorbance of light by a material, in this case to transmission illumination. In this case, absorbance or blocking of transmitted light is due to the depositing of opaque toner particles on a transparent substrate. The optical density is proportional to the number of particles deposited, which, is in turn proportional to the amount of charge generated by the X-ray imaging chamber in the XERG System. Optical densities of 4 to 5 indicate that the illuminating light is 99.99 to 99.999% absorbed. The toner is arrayed 4 to 5 particle diameters (or layers) deep.

Figure 2:
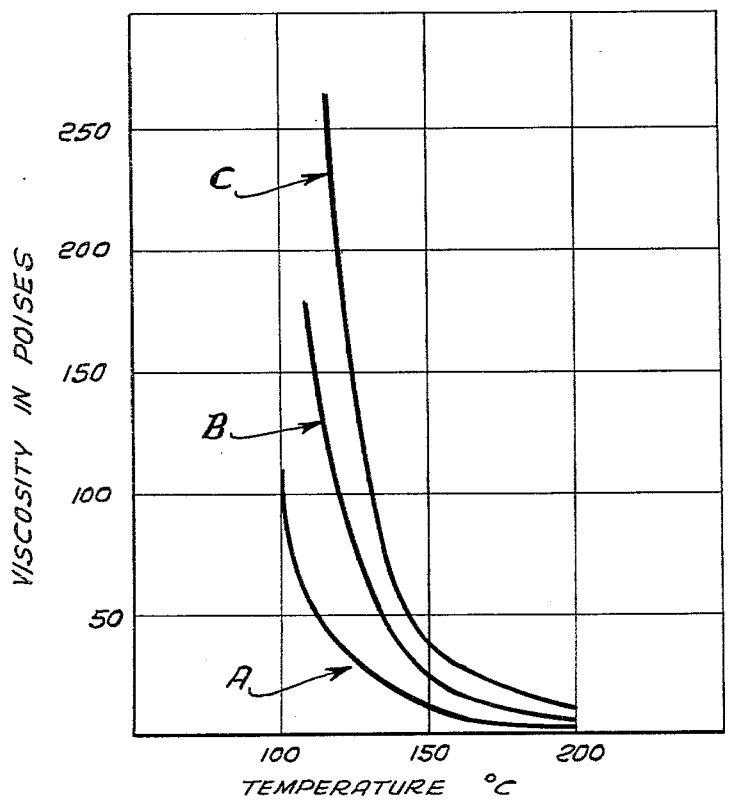
FIG. 2 is a graph illustrating the decrease in the viscosity of the melted resins used in the adhesive layer with an increase in temperature.

Illustrated in FIG. 2 are the viscosity-temperature curves for Versamid 930, reference letter A; Versamid 940, reference letter B; and Versamid 950, reference letter C. The Versamids are low molecular weight polyamide resin adhesives produced by General Mills Corporation of Minneapolis, Minn. The Versamid resins are a condensation polymerization product of ethylene diamine and dimerized linoleic acid. Versamid 930 best fits the above description for the adhesive layer 13. The Versamids exhibit the important characteristics of sharply melting between about 105° C. and 115° C. to rather low melt viscosities as shown in FIG. 2 and of being compatible with the toner formulations. The Versamids have relatively good adhesion for PET, particularly after the PET has been corona treated.

Examples of possible alternatives for Versamid 930 as the adhesive layer 13 in the composite lamination film are Versamids 940, 950 and 1635, as well as low molecular weight Versalon polyamide resins also produced by General Mills Corporation of Minneapolis, Minn., which are structurally related. The Versalons are polyamide resins having fatty chain diamines substituted for the ethylene diamine of the Versamids. Low molecular weight polyacrylics of high fatty ester content and some crystallinity may also be used provided similar resins are present in the toner for compatibility.

Non-polar is defined as showing little or no dipole moment (statistical charge separation) as a molecule. This results from a molecule containing atomic bonds with little or no dipole moment, or from a molecule containing somewhat polar atomic bonds of higher dipole moment, but which are cancelling or oriented in symmetrically opposite directions such that the overall dipole moment of the total molecule is very low or zero. In general, in organic materials where carbon is the base atom, molecules containing tetrahedral C—C single bonds and tetrahedrally oriented C—H bonds only show little or no dipole moment (less than 0.1 Debye unit)*. Such materials are called alkanes or aliphatic hydrocarbons. As multiple carbon-carbon bonds are introduced, the molecules are still of low polarity in that they show low dipole moments (less than 0.8 Debye unit). They are referred to as olefinic, acetylenic or aromatic hydrocarbons and are of slightly stronger solvent power than the aliphatics. As carbon bonded to Group VA, VIA or VIIA elements in the periodic table are introduced, the bonds usually become more polar and often less symmetrically oriented, giving rise to higher dipole moment molecules (greater than 1 Debye unit).

*NOTE: 1 Debye unit equals $10^{-18}$ esu.

Proportionally high aliphatic hydrocarbon content means having a dipole moment of less than about 0.5 Debye units or having an aliphatically bound carbon content of at least 60 mole%.

The heated back roller 4 or stationary hot shoe is used since conducted heat is more efficient than radiant heat and because the heat must be applied close to or at the nip. Otherwise, too much cooling of the resin occurs if the heat source is removed prior to actual contact between the films to be laminated. The softer, rubber-coated roller 5 behind the imaging film is not heated, running at ambient temperature. The heated back roller 4 or shoe should be run anywhere between 100° and 160° C., but preferably between 120° and 150° C. Too low temperatures give insufficient melting, whereas too high temperatures distort the toner deposits and/or the film. The roller speed can be varied to some extent to accommodate required transport speeds and the roller radius is not critical. The important roller properties are rigidity and concentricity. The roller surface should be hard and polished metal or it may be Teflon coated to avoid scratching the film. Preferred is a roller 4 with about a 2 inch radius. The apparatus parameters may be varied with the primary requirement being that layer 13 reach about 100° to 130° C. at the nip, depending on the particular resin used in layer 13. Higher roller or shoe temperatures will allow a little faster transport speed or are necessary when layers 11 and 12 are at the high end of their ranges (transport speed range is about 1 inch/3 to 5 seconds). With 2 mil PET as layer 11 and ½ mil PE as layer 12, about 10 seconds at a roller temperature of 132° C. sufficiently melts 0.3 mil of Versamid 930 as layer 13 for good lamination. Very little pressure is required to enable the resin to penetrate the toner deposits since the adhesive penetrates by capillaries generated by the surface tension forces. The pressure insures contact at all points. A minimum of pressure is employed, since too much pressure squeezes out excess resin in areas of low density. Typically, the roller pressures are from about 0.5 psi to about 20.0 psi. The composite laminate is cooled to a temperature at which the adhesive resin layers resolidify, preferably below 90° C. for Versamid 930.

One embodiment of a suitable plastic dielectric receptor sheet 2 is more fully described in U.S. Pat. Ser. No. 679,067, filed Apr. 21, 1976 and entitled Electron Radiograph Receptor by Murray Samuel Welkowsky. The receptor sheet 2 which carries the toned image is usually made of the same optically clear PET film as the support layer 11.

The toner 14 is a low charge or high density producing, high resolution liquid toner for radiographic imaging such as is supplied by Xonics. Such toners are dispersed in non-polar aliphatic hydrocarbon media and because of their low charge, the particles are coated with non-polar aliphatic hydrocarbon character resin. Therefore, the laminating resin should have aliphatic hydrocarbon characteristics to be compatible with the toner resins so that the toner particles are wet by the laminating resins during bonding.

EXAMPLE 1

A 2.0 mil polyester film having a 0.5 mil polyethylene coating (Melinex ® 442) is corona treated resulting in a surface tension of 40 dynes/cm on the polyethylene layer prior to coating with the adhesive layer. A Versamid 930 resin coating is applied by gravure roller from a solvent is isopropanol and toluene (90:10 by volume) giving a dry film adhesive layer 0.3 mil. This laminating film when applied to a receptor sheet to produce a laminate has a laminate bond peel strength greater than 2 pounds/in (failure of the support layer).

Peel strength (lbs/in or kg/in) of laminated films is measured by cutting 1 inch strips with free, unlaminated ends and clamping them (completely across the 1 inch) in the jaws of an Instron testing machine or with an attached hook to which weights can be added. With a laminate of minimum acceptable peel strength, no peel is measured at 1.0 kg/in and peeling is initiated at 1.1 kg/in (with PET destruction) by hand applying the weights; hence the estimate of greater than 2 pounds/in peel strength.

EXAMPLE 2

The polyester (PET) is corona treated immediately before application of the PE by extrusion since the treatment reverts on PET. A standard extruder for film coating is used. Examples of commercially available materials are Laminating Film 150 and 350 from Laminex, Inc., Santa Ana, Calif. and Vacu-Guard or Tough-Guard material from Guardian Packaging, Inc., Newark, Calif. All are PET (usually 0.5 mil) with varying thicknesses of PE extruded on. Versamid 930 resin from an isopropanol-toluene (90:10) solvent is coated onto the corona treated PET/PE film by application with a gravure roller and air dried giving a dry film adhesive layer 0.3 mil.

EXAMPLE 3

A 2 mil Melinex ® 442 film (proprietary pretreated for shrink resistance and adhesion) is extrusion coated with 0.5 mil of Dow PE Resin 5004, corona discharge treated to 40 dynes/cm and solution coated with Versamid 930 resin from an isopropanol-toluene (90:10) solvent using a gravure roller to give a 0.3 mil air dried Versamid 930 film. The laminating film is wound on a roll containing about 1000 linear feet, 8.00±0.03 inches wide, 0.0028±0.0001 inch thick with the Versamid resin layer wound on the inside of the roll.

We claim as our invention:
1. A composite lamination film for electrophoretically toned images deposited on a plastic dielectric receptor sheet, comprising, in combination:
an optically transparent, flexible support layer of a material selected from the group consisting of polyethylene terephthalate, polycarbonate, poly- sulfone, cellulose triacetate or a vinyl chloride/vinylidene chloride copolymer resin, and of a thickness of from 0.1 to 7.0 mils;

an optically transparent, flexible intermediate layer of a heat softenable film of a material selected from the group consisting of low density polyethylene resin, polypropylene resin or copolymer resin of ethylene or propylene with relatively small amounts of vinyl or acrylic monomers, and of a thickness from about 0.05 to 4.0 mils, and applied to one side of said support layer, said intermediate layer having good adhesion to said support layer; and an optically transparent, flexible adhesive layer of a heat softenable film comprising a low molecular weight fatty polyamide or polyacrylic resin, and of a thickness from about 0.05 to 2.5 mils, and applied to the free side of said intermediate layer, said adhesive layer having good adhesion to said intermediate layer and adapted to have good adhesion to said receptor sheet and said toned images deposited on said receptor sheet, said adhesive layer reaching a low melt viscosity at or below 120° C. to insure good penetration of said dried toner deposits.

2. The lamination film of claim 1 wherein the support layer is polyethylene terephthalate.

3. The lamination film of claim 1 wherein the intermediate layer is low density polyethylene resin.

4. The lamination film of claim 1 wherein the adhesive layer is a low molecular weight fatty polyamide resin.

5. A composition lamination film for electrophoretically toned images deposited on a plastic receptor sheet, comprising, in combination:

an optically transparent support layer of a flexible, shrink and scratch resistant, mechanically strong polyethylene terephthalate film of a thickness of from 0.1 to 7.0 mils, said polyethylene terephthalate film having a sufficiently high melting point to remain undistorted in the presence of heat softened adhesives;

an optically transparent intermediate layer of a flexible, heat softenable low density polyethylene film of a thickness from about 0.05 to 4.0 mils, and applied to one side of said support layer, said intermediate layer having good adhesion to said support layer, said intermediate layer having good chemical compatibility with an adhesive layer, a moderately high molecular weight to give high tensile strength to the laminate bond and a softening point below the distortion point of said support layer; and an optically transparent adhesive layer of a flexible, heat softenable low molecular weight fatty polyamide film of a thickness from about 0.05 to 2.5 mils, and applied to the free side of said intermediate layer, said adhesive layer having good adhesion to said intermediate layer and adapted to have good adhesion to said receptor sheet and said toned images deposited on said receptor sheet, said adhesive layer softening below the distortion point of said support layer and reaching a low melt viscosity at or below 120° C. to insure good penetration of said dried toner deposits said adhesive layer having a relatively low molecular weight, non-polar character, high aliphatic hydrocarbon content to be compatible with said dried toner deposits and said intermediate layer and said adhesive layer showing no blocking or distortion up to about 60° C.

6. A composite laminate containing electrophoretically toned images, comprising, in combination:

an optically transparent receptor sheet, an optically transparent, flexible adhesive layer of a heat softenable film comprising a low molecular weight fatty polyamide or polyacrylic resin, and of a thickness from about 0.05 to 2.5 mils, and applied to said receptor sheet, said adhesive layer having good adhesion to said receptor sheet, said toned images deposited on said receptor sheet and to an intermediate layer to give a highly peel resistant bond, said adhesive layer reaching a low melt viscosity at or below 120° C. to insure good penetration of said dried toner deposits, an optically transparent, flexible intermediate layer of a heat softenable film of a material selected from the group consisting of low density polyethylene resin, polypropylene resin or copolymer resin of ethylene or propylene with relatively small amounts of vinyl or acrylic monomers, and of a thickness from about 0.05 to 4.0 mils, and applied to said adhesive layer, said intermediate layer having good adhesion to said adhesive layer and to a support layer, and an optically transparent, flexible support layer of a material selected from the group consisting of polyethylene terephthalate, polycarbonate, polysulfone, cellulose triacetate or a vinyl chloride/vinylidene chloride copolymer resin, and of a thickness of from 0.1 to 7.0 mils, and applied to said intermediate layer.

7. A composite laminate containing electrophoretically toned images, comprising, in combination:

an optically transparent receptor sheet of flexible, shrink and scratch resistant, mechanically strong film, said receptor sheet having a sufficiently high melting point to remain undistorted in the presence of heat softened adhesives, said receptor sheet having electrophoretically toned images deposited thereon, an optically transparent adhesive layer of a flexible, heat softenable film comprising a low molecular weight fatty polyamide or polyacrylic resin, and of a thickness from about 0.05 to 2.5 mils, and applied to said receptor sheet, said adhesive layer having good adhesion to said receptor sheet, said toned images deposited on said receptor sheet and an intermediate layer to give a highly peel resistant bond, said adhesive layer softening below the distortion point of a support layer, said adhesive layer reaching a low melt viscosity at or below 120° C. to insure good low shear fluid penetration of said dried toner deposits, said adhesive layer having a relatively low molecular weight, a relatively non-polar character and a proportionately high aliphatic hydrocarbon content to be compatible with said dried toner deposits and said intermediate layer, an optically transparent intermediate layer of a flexible, heat softenable film of a material selected from the group consisting of low density polyethylene resin, polypropylene resin or copolymer resin of ethylene or propylene with relatively small amounts of vinyl or acrylic monomers, and of a thickness from about 0.05 to 4.0 mils, and applied to said adhesive layer, said intermediate layer having good adhesion to said adhesive layer and to a support layer, said intermediate layer having good chemical compatibility with said adhesive layer, said intermediate layer having a moderately high molecular weight to give a high tensile strength to the laminate bond, said intermediate layer softening below the distortion point of said support layer and adhering to said receptor sheet, said adhesive layer and said support sheet, and an optically transparent support layer of flexible, shrink and scratch resistant, mechanically strong film of a material selected from the group consisting of polyethylene terephthalate, polycarbonate, polysulfone, cellulose triacetate or a vinyl chloride/vinylidene chloride copolymer resin, and of a thickness of from 0.1 to 7.0 mils, and applied to said intermediate layer, said support layer having a sufficiently high melting point to remain undistorted in the presence of heat softened adhesives.

8. A process for preparing a composite laminate containing electrophoretically toned images which comprise the steps of:

heating a laminating film to a temperature of from about 80° C. to 160° C. to soften an intermediate and adhesive layers, said laminating film comprising, in combination:

an optically transparent, flexible support layer of a material selected from the group consisting of polyethylene terephthalate, polycarbonate, polysulfone, cellulose triacetate or a vinyl chloride/vinylidene chloride copolymer resin, and of a thickness of from 0.1 to 7.0 mils;

an optically transparent, flexible intermediate layer of a heat softenable film of a material selected from the group consisting of low density polyethylene resin, polypropylene resin or copolymer resin of ethylene or propylene with relatively small amounts of vinyl or acrylic monomers, and of a thickness from about 0.05 to 4.0 mils, and applied to one side of said support layer, said intermediate layer having good adhesion to said support layer; and an optically transparent, flexible adhesive layer of a heat softenable film comprising a low molecular weight fatty polyamide or polyacrylic resin, and of a thickness from about 0.05 to 2.5 mils, and applied to the free side of said intermediate layer, said adhesive layer having good adhesion to said intermediate layer and to a receptor sheet and said toned images deposited on said receptor sheet, said adhesive layer reaching a low melt viscosity at or below 120° C. to insure good penetration of said dried toner deposits;

applying said laminating film to an optically transparent receptor sheet to form a composite laminate, said receptor sheet comprising an optically transparent sheet, said sheet having electrophoretically toned images deposited thereon; and cooling said composite laminate to a temperature at which the adhesive resin layers resolidify.

9. A process for preparing a composite laminate containing electrophoretically toned images which comprise the steps of:

heating a laminating film to a temperature of from about 80° C. to 160° C. to soften intermediate and adhesive layers thereof, said laminating film comprising, in combination:

an optically transparent support layer of flexible, shrink and scratch resistant, mechanically strong film, said support layer having a sufficiently high melting point to remain undistorted in the presence of heat softened adhesives, said support layer selected from the group consisting of polyethylene terephthalate, polycarbonate, polysulfone, cellulose triacetate or a vinyl chloride/vinylidene chloride copolymer resin, and of a thickness of from 0.1 to 7.0 mils, an optically transparent intermediate layer of a flexible, heat softenable film applied to one side of said support layer, said intermediate layer having good adhesion to said support layer, said intermediate layer having good chemical compatibility with an adhesive layer, said intermediate layer having a moderately high molecular weight to give high tensile strength to the laminate bond, said intermediate layer softening below the distortion point of said support layer and adhering to said adhesive layer and said support sheet, said intermediate layer selected from the group low density polyethylene resin, polypropylene resin or copolymer resin of ethylene or propylene with relatively small amounts of vinyl or acrylic monomers, and of a thickness from about 0.05 to 4.0 mils, and an optically transparent adhesive layer of a flexible, heat softenable film applied to the free side of said intermediate layer, said adhesive layer having good adhesion to said intermediate layer and to a receptor sheet and said toned images deposited on said receptor sheet, said adhesive layer softening below the distortion point of said support layer, said adhesive layer reaching a low melt viscosity at or below 120° C. to insure good penetration of said dried toner deposits, said adhesive layer having a relatively low molecular weight, a relatively non-polar character and a proportionately high aliphatic hydrocarbon content to be compatible with said dried toner deposits and said intermediate layer, said adhesive layer showing no blocking or distortion, said adhesive layer comprising a low molecular weight fatty polyamide or polyacrylic resin, and of a thickness from about 0.05 to 2.5 mils;

applying said laminating film to an optically transparent receptor sheet to form a composite laminate, said receptor sheet comprising an optically transparent sheet of flexible, shrink and scratch resistant, mechanically strong film, said sheet having a sufficiently high melting point to remain undistorted in the presence of heat softened adhesives, said sheet having electrophoretically toned images deposited thereon; and cooling said composite laminate to a temperature at which the adhesive resin layers resolidify.

* * * * *